(12) United States Patent
Tano et al.

(10) Patent No.: US 10,855,910 B2
(45) Date of Patent: Dec. 1, 2020

(54) ELECTRONIC DEVICE, METHOD, AND PROGRAM

(71) Applicant: KYOCERA Corporation, Kyoto (JP)

(72) Inventors: Masaki Tano, Tokyo (JP); Masayoshi Kondo, Yokohama (JP); Yusuke Suzuki, Yokohama (JP); Masaya Kawakita, Yokohama (JP); Seiji Yamada, Yokohama (JP); Tomohiro Hamaguchi, Yokohama (JP); Koji Saijo, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/551,159

(22) Filed: Aug. 26, 2019

(65) Prior Publication Data

US 2020/0068134 A1 Feb. 27, 2020

Related U.S. Application Data

(60) Provisional application No. 62/729,601, filed on Sep. 11, 2018.

(30) Foreign Application Priority Data

Aug. 27, 2018 (JP) ................................. 2018-158296

(51) Int. Cl.
*H04N 5/232* (2006.01)

(52) U.S. Cl.
CPC . *H04N 5/232127* (2018.08); *H04N 5/232125* (2018.08)

(58) Field of Classification Search
CPC .. H04N 5/232127; H04N 5/125; H04N 5/232; H04N 5/222; H04N 5/257; G02B 7/28; G03B 13/36
See application file for complete search history.

(56) References Cited

U.S. PATENT DOCUMENTS

| 2011/0038510 A1* | 2/2011 | Nakamura | G06T 7/571 |
| | | | 382/106 |
| 2013/0044212 A1* | 2/2013 | Uehara | H04N 7/18 |
| | | | 348/135 |

(Continued)

FOREIGN PATENT DOCUMENTS

| JP | 2015-041865 A | 3/2015 |
| JP | 2015-104031 A | 6/2015 |

*Primary Examiner* — Antoinette T Spinks
(74) *Attorney, Agent, or Firm* — Studebaker & Brackett PC

(57) ABSTRACT

An electronic device according to a first aspect comprises an imaging device and a processor. The imaging device has a predetermined imaging region, and is configured to capture images having different focal distances. The processor is configured to execute a first process of identifying two or more focus identification regions included in a first imaging region included in the predetermined imaging region by comparing the captured images in the first imaging region, and a second process of interpolating a focal distance of a middle region not belonging to the two or more focus identification regions in the first imaging region. The second process includes a process of interpolating the focal distance of the middle region based on a focal distance of an interpolation focus region that is located inside or outside the middle region and that is one of the two or more focus identification regions.

14 Claims, 13 Drawing Sheets

(56) References Cited

U.S. PATENT DOCUMENTS

2013/0307993 A1* 11/2013 Kawarada ........ H04N 5/232123
  348/169
2016/0277656 A1   9/2016 Tsunoda

* cited by examiner

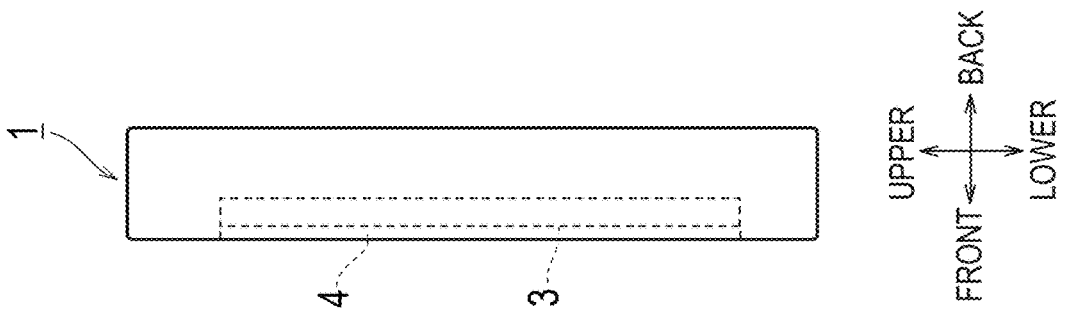
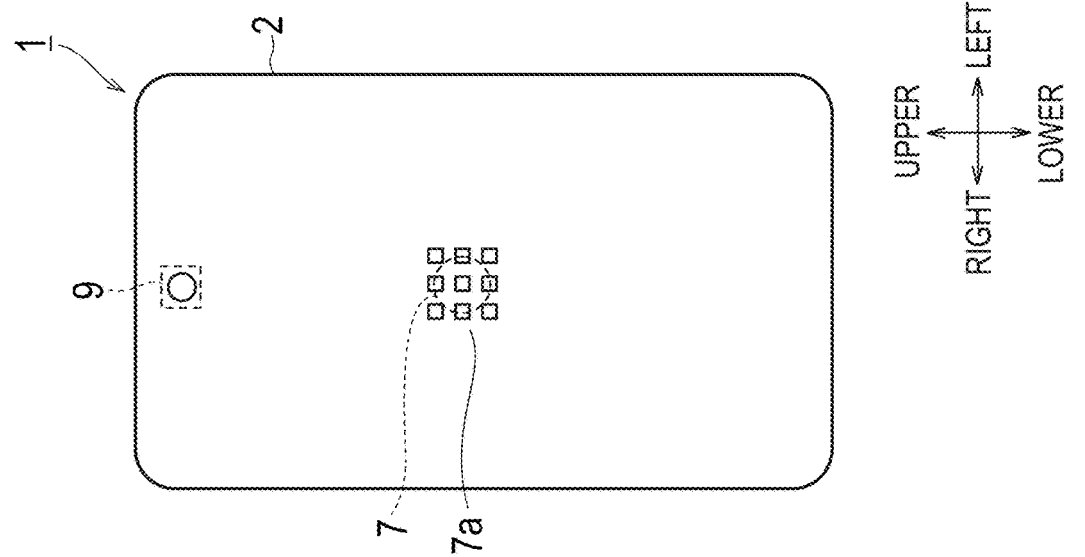
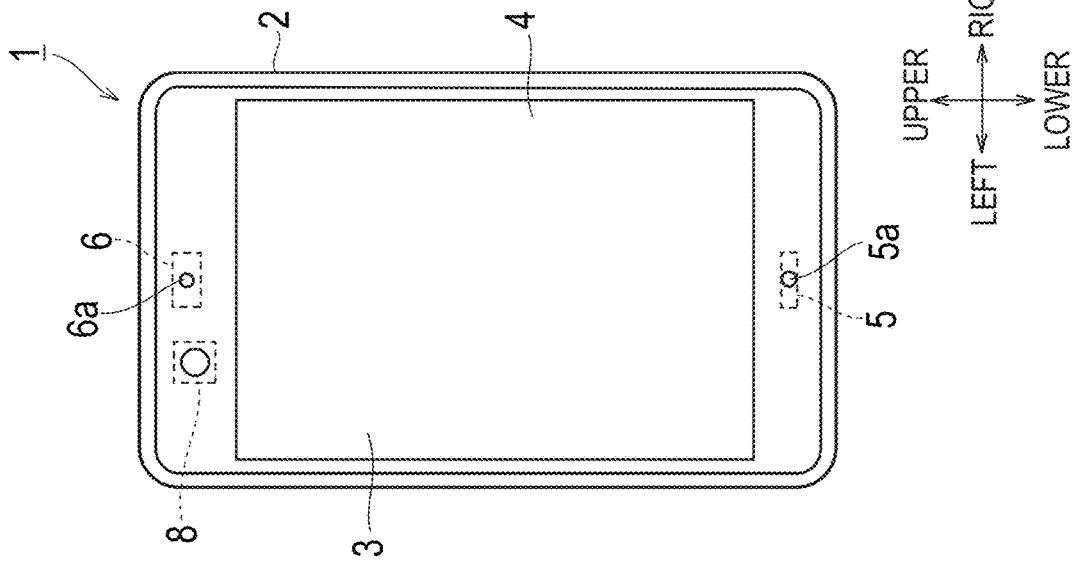

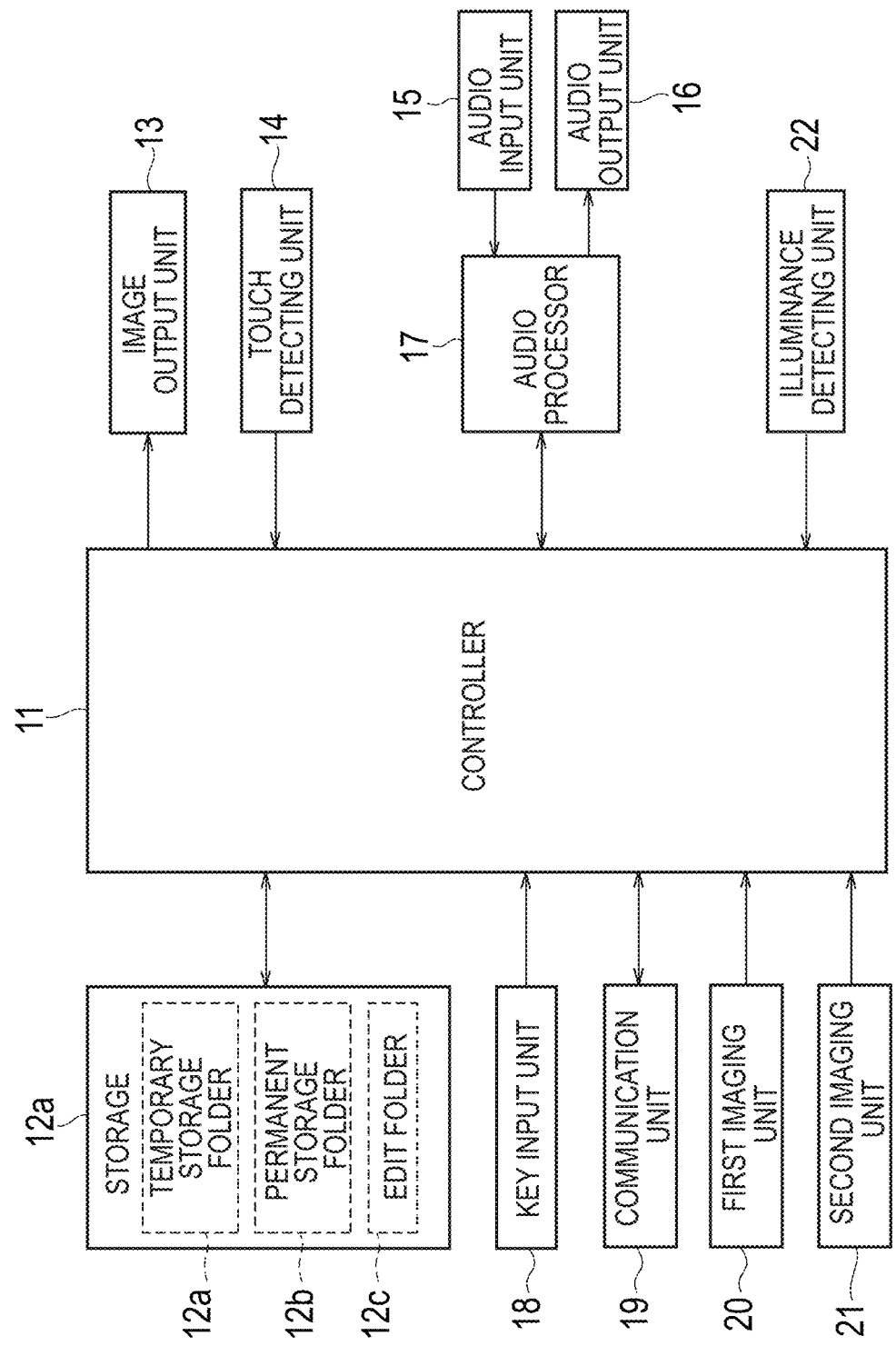

FIG. 3
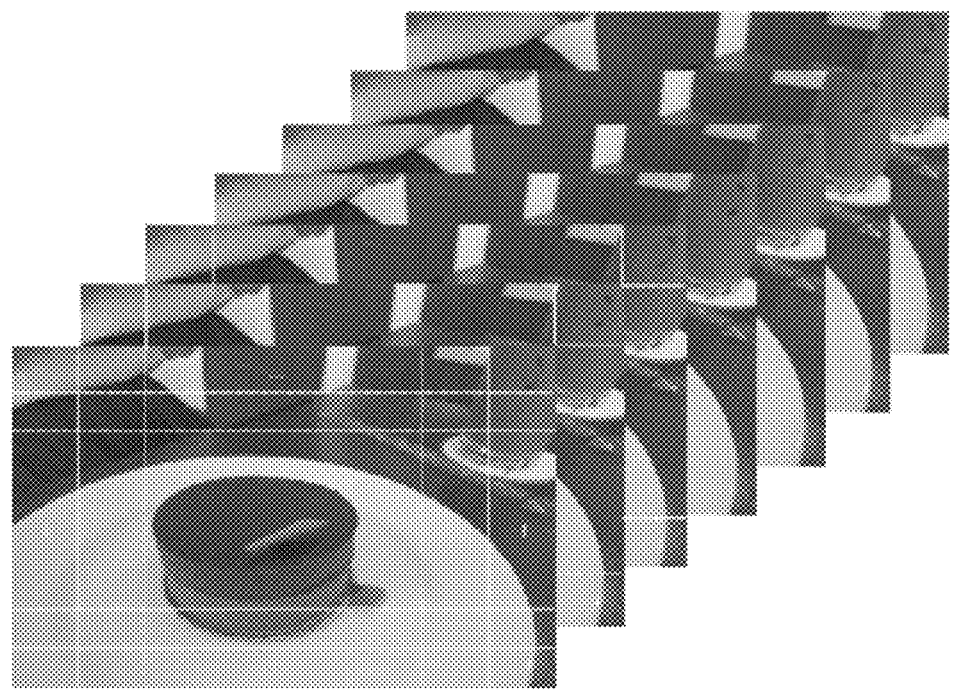
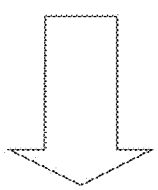
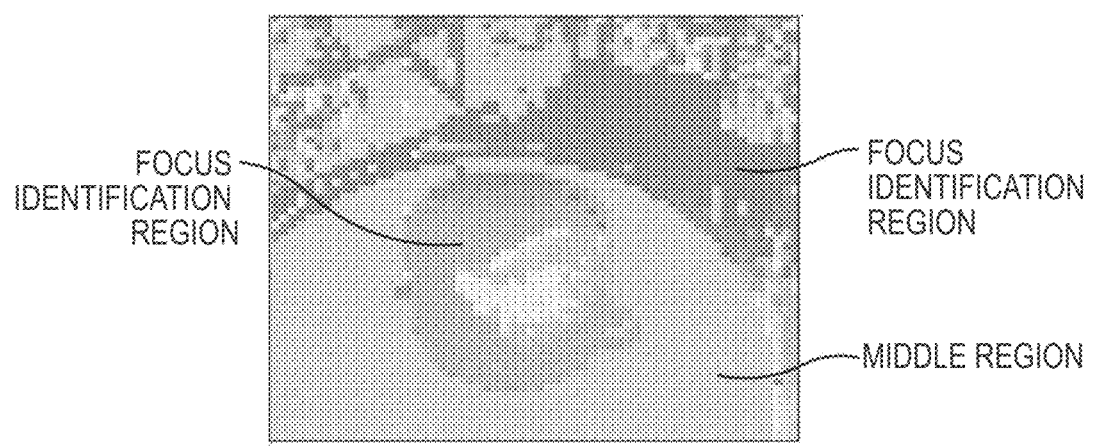

FIG. 4
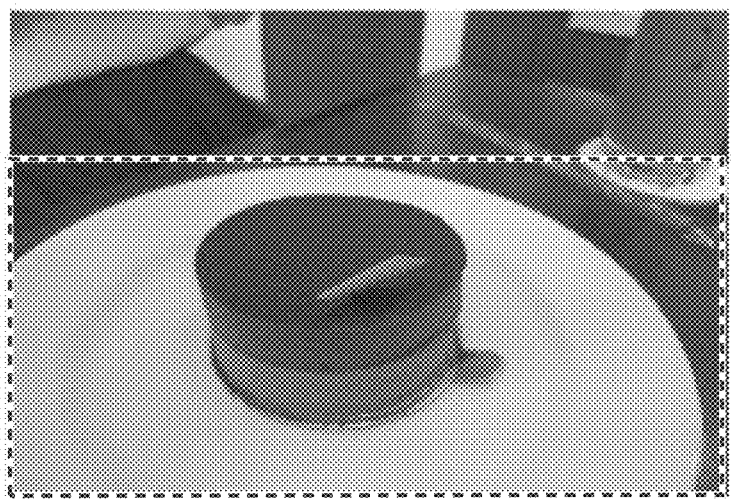
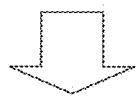
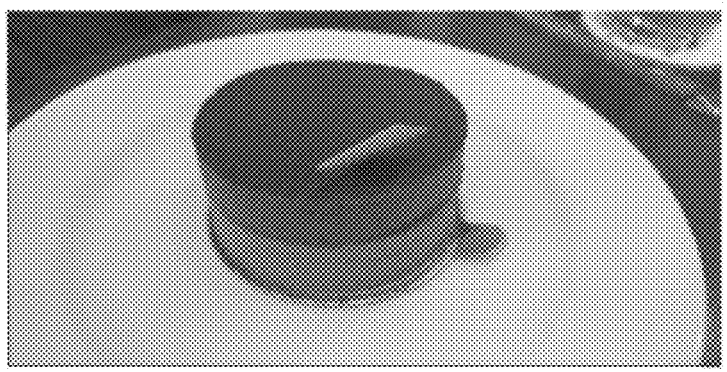
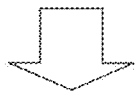
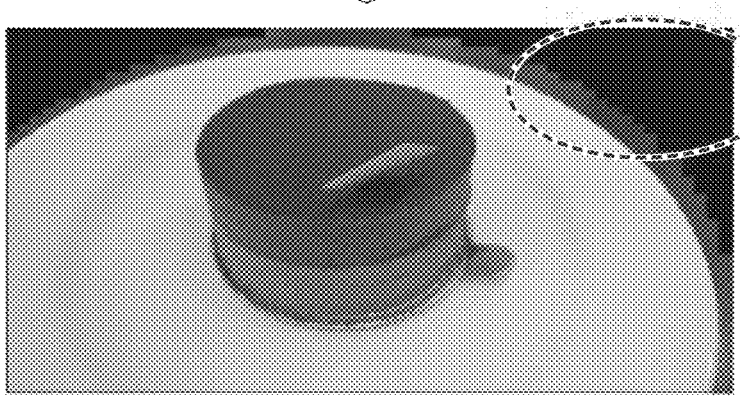
PREDETERMINED COLOR CONVERSION FIG. 5
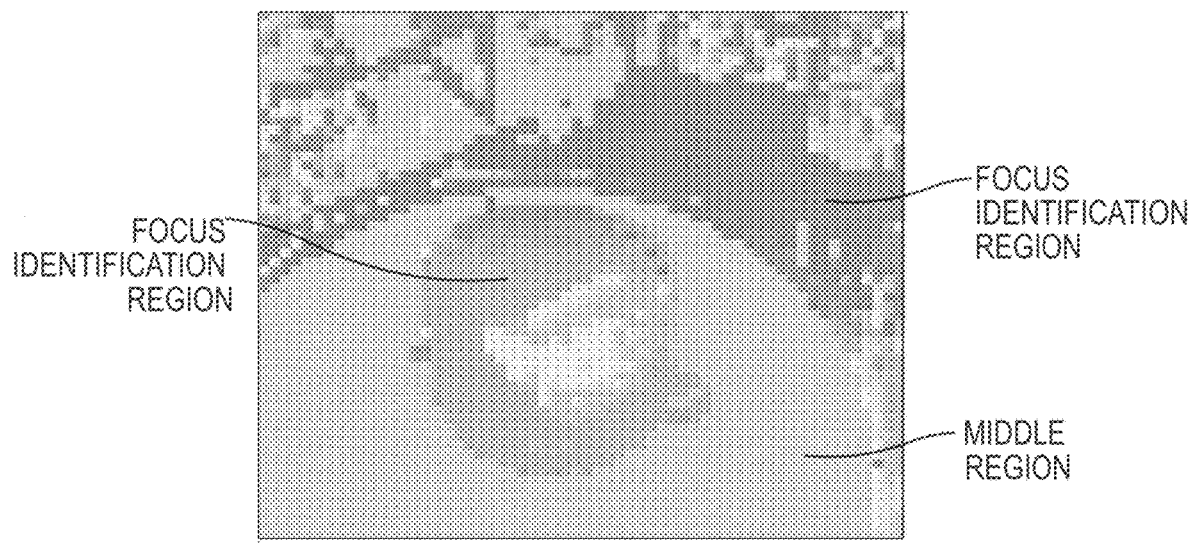
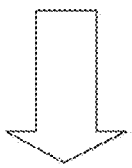
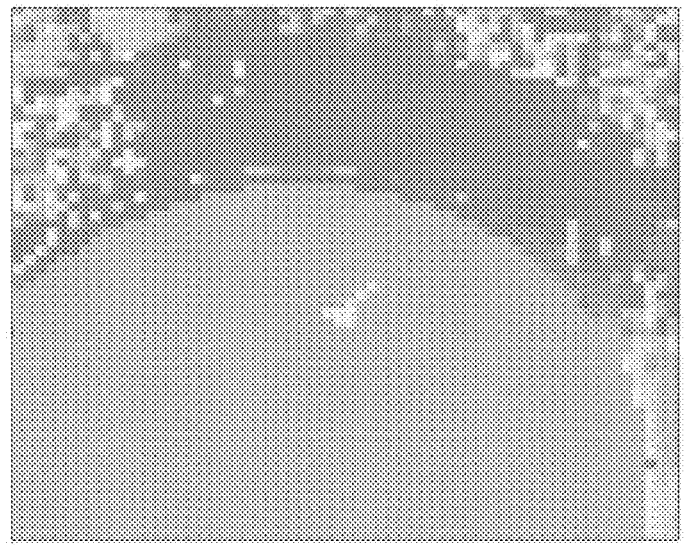

FIG. 6
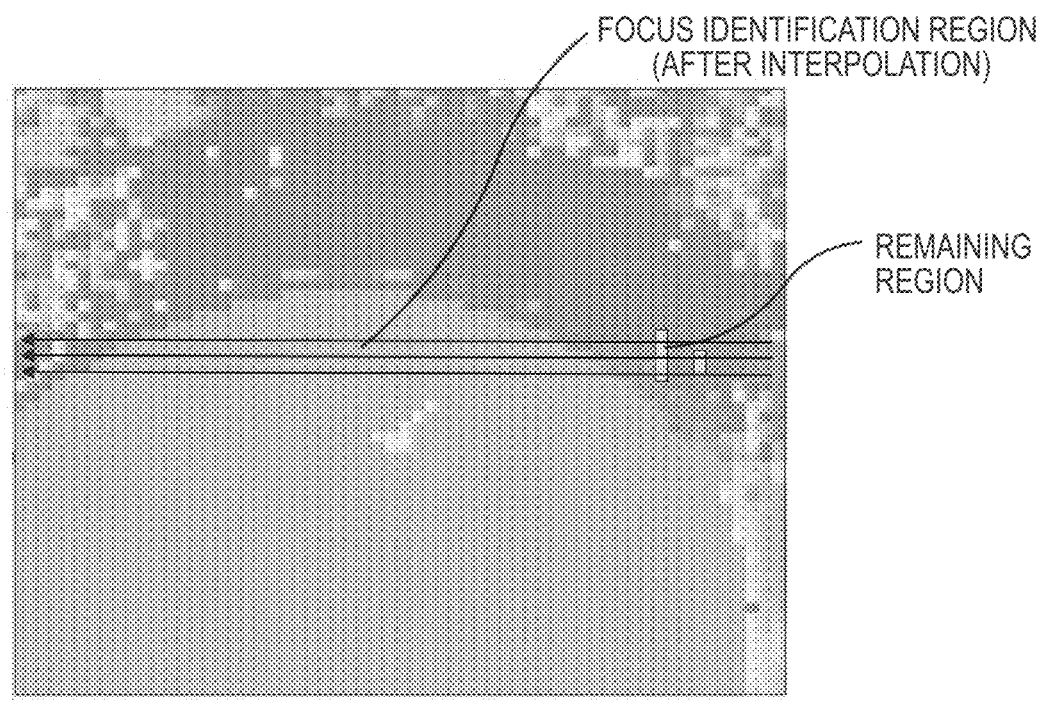
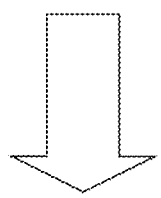
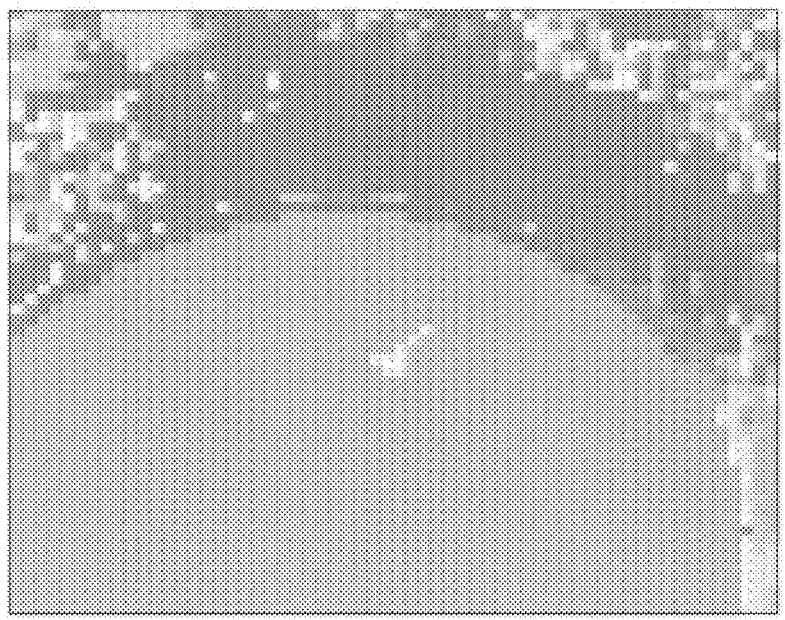

FIG. 10
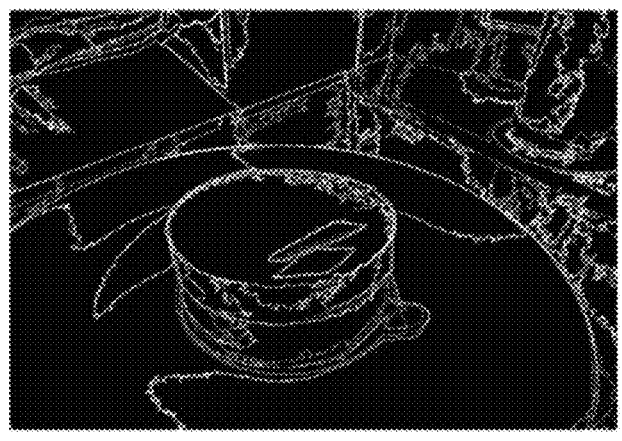
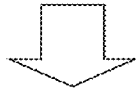
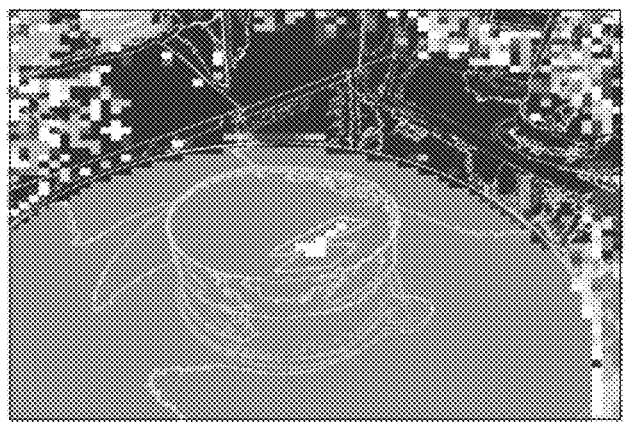
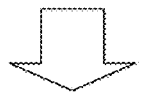
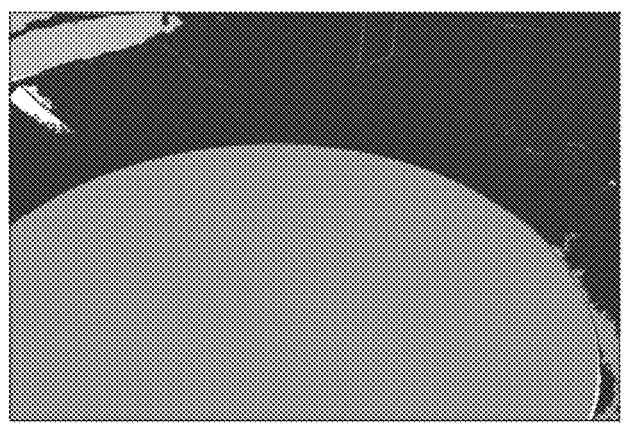

ELECTRONIC DEVICE, METHOD, AND PROGRAM

RELATED APPLICATION

This application claims the benefit of JP Application No. 2018-158296 filed Aug. 27, 2018, and U.S. Provisional Application No. 62/729,601 filed Sep. 11, 2018, the entire contents of which are incorporated herein by reference.

TECHNICAL FIELD

The present disclosure relates to an electronic device, a method, and a program.

BACKGROUND ART

In recent years, techniques have been offered for capturing a plurality of captured images having different focal distances and distinguishing a subject region from a background region using edge components included in the plurality of captured images.

SUMMARY

An electronic device according to a first aspect comprises an imaging device and a processor. The imaging device has a predetermined imaging region, and is configured to capture images having different focal distances. The processor is configured to execute a first process of identifying two or more focus identification regions included in a first imaging region included in the predetermined imaging region by comparing the captured images in the first imaging region. The processor is configured to execute a second process of interpolating a focal distance of a middle region not belonging to the two or more focus identification regions in the first imaging region. The second process includes a process of interpolating the focal distance of the middle region based on a focal distance of an interpolation focus region that is located inside or outside the middle region and that is one of the two or more focus identification regions.

A method according to a second aspect is a method for use in an electronic device including at least an imaging device having a predetermined imaging region, and is configured to capture images having different focal distances. The method comprises identifying two or more focus identification regions included in a first imaging region included in the predetermined imaging region by comparing the plurality of captured images in the first imaging region, and interpolating a focal distance of a middle region not belonging to the two or more focus identification regions in the first imaging region. The interpolating the focal distance of the middle region includes interpolating the focal distance of the middle region based on a focal distance of an interpolation focus region that is located inside or outside the middle region and that is one of the two or more focus identification regions.

A program according to a third aspect is a program for use in an electronic device comprising at least an imaging device having a predetermined imaging region, and is configured to capture images having different focal distances. The program causes a computer to execute identifying two or more focus identification regions included in a first imaging region included in the predetermined imaging region by comparing the captured images in the first imaging region, and interpolating a focal distance of a middle region not belonging to the two or more focus identification regions in the first imaging region. The interpolating the focal distance of the middle region includes interpolating the focal distance of the middle region based on a focal distance of an interpolation focus region that is located inside or outside the middle region and that is one of the two or more focus identification regions.

BRIEF DESCRIPTION OF DRAWINGS

FIG. 1A is a front view of a mobile terminal 1 according to an embodiment, FIG. 1B is a rear view of the mobile terminal 1 according to the embodiment, and FIG. 1C is a right side view of the mobile terminal 1 according to the embodiment;

FIG. 2 is a block diagram of the mobile terminal 1 according to the embodiment;

FIG. 3 is a diagram showing an example of a depth map according to the embodiment;

FIG. 4 is a diagram for explaining a reidentification of a middle region according to the embodiment;

FIG. 5 is a diagram for explaining a first interpolation process according to the embodiment;

FIG. 6 is a diagram for explaining a second interpolation process according to the embodiment;

FIG. 10 is a view for explaining a correction process according to a modification;

DESCRIPTION OF THE EMBODIMENT

Figure 7:
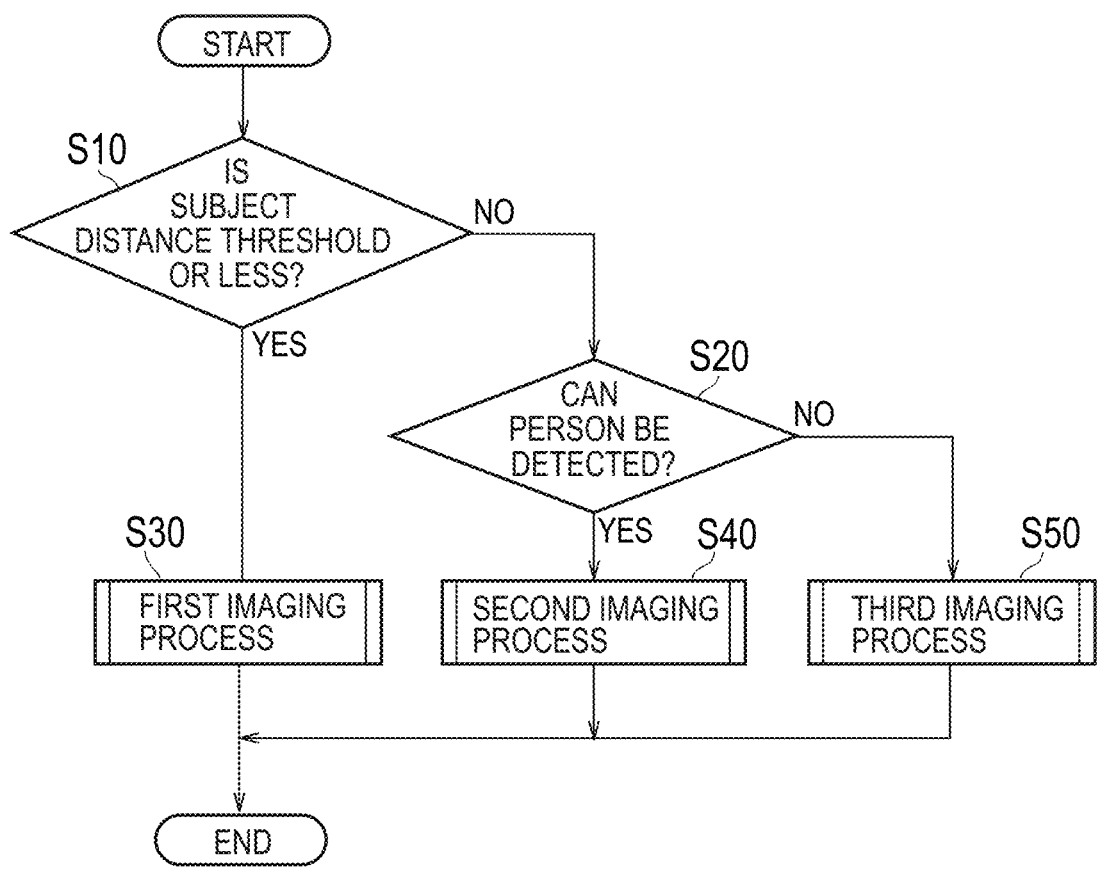
FIG. 7 is a diagram showing an image processing method according to the embodiment.

In region identification using an edge component, there may exist a region (for example, a single color region) in which an edge component does not appear in any captured images. That is, there is room for improvement in the technology for identifying the focal distance of the imaging region.

Therefore, the present disclosure has been made to solve the above-described problems, and makes it possible to appropriately interpolate a focal distance of an imaging region.

Embodiments will be described below with reference to the drawings. In the following description of the drawings, the same or similar parts are denoted by the same or similar reference numerals.

However, it should be noted that the drawings are schematic, and ratios of dimensions may be different from actual ones. Therefore, specific dimensions and the like should be determined in consideration of the following description. Moreover, it is a matter of course that there may be portions where dimensional relationships or proportions are different among the drawings.

EMBODIMENTS (Overview of Electronic Device)

The electronic device according to the embodiments will be described below. In the embodiment, a mobile terminal 1 will be described as an example of the electronic device. The mobile terminal 1 may be a smartphone, a tablet terminal, or the like. In FIGS. 1A to 1C, the longitudinal direction of a cabinet 2 is defined as the vertical direction, and the short direction of the cabinet 2 is defined as the lateral direction. A direction perpendicular to the vertical direction and the lateral direction is defined as the front-rear direction.

As shown in FIGS. 1A to 1C, the mobile terminal 1 includes the cabinet 2, a display 3, a touch panel 4, a microphone 5, a speaker 6, an external speaker 7, and an in-camera 8, and an out-camera 9.

The cabinet 2 is a housing that houses the components shown in FIG. 2. The cabinet 2 has a substantially rectangular outline when viewed from the front.

The display 3 is provided on the front of the cabinet 2. The display 3 displays various images. For example, the display 3 may be a liquid crystal display having a liquid crystal panel and an LED backlight, may be an organic EL display, or may be another display.

The touch panel 4 is provided to cover the display 3. The touch panel 4 is formed of a transparent sheet-like member. The touch panel 4 may be a touch panel of various types such as a capacitance type, an ultrasonic type, a pressure-sensitive type, a resistance film type, a light detection type, and the like.

The microphone 5 is provided inside the cabinet 2 and is provided at the lower end of the cabinet 2. The microphone 5 detects a sound. Specifically, the microphone 5 detects a sound through a microphone hole 5a formed on the front of the cabinet 2. The microphone 5 generates an electrical signal according to the detected sound.

The speaker 6 is provided inside the cabinet 2 and is provided at the upper end of the cabinet 2. The speaker 6 outputs a sound. Specifically, the speaker 6 outputs a sound through an output hole 6a formed on the front of the cabinet 2. The speaker 6 may output the voice of the other person, or may output another notification sound or the like.

The external speaker 7 is provided inside the cabinet 2 and is provided on the rear of the cabinet 2. The external speaker 7 outputs a sound through an output hole 7a formed on the rear of the cabinet 2. The external speaker 7 may output a notification sound notified from an application installed in the mobile terminal 1.

The in-camera 8 is an example of an imaging device, and is provided on the top and front of the cabinet 2. The in-camera 8 captures an imaging target facing the front of the mobile terminal 1. For example, the in-camera 8 includes a CCD, a CMOS sensor, and a wide-angle lens. The in-camera 8 may capture a plurality of captured images having a predetermined imaging region and having different focal distances.

The out-camera 9 is an example of an imaging device and is provided on the rear of the cabinet 2. The out-camera 9 captures an imaging target facing the rear of the mobile terminal 1. For example, the in-camera 9 includes a CCD, a CMOS sensor, and a wide-angle lens. The out-camera 9 may capture a plurality of captured images having a predetermined imaging region and having different focal distances.

(Mobile Terminal)

Hereinafter, the mobile terminal according to the embodiments will be described.

As shown in FIG. 2, the mobile terminal 1 includes a control unit 11, a storage unit 12, an image output unit 13, a touch detection unit 14, an audio input unit 15, an audio output unit 16, and an audio processing unit 17, a key input unit 18, a communication unit 19, a first imaging unit 20, a second imaging unit 21, and an illuminance detection unit 22.

The control unit 11 has at least one processor. The control unit 11 has a control circuit constituted by a CPU, a memory, and the like. The control unit 11 controls respective components of the mobile terminal 1. Details of the control unit 11 will be described later.

The storage unit 12 stores various information. For example, the storage unit 12 is constituted by a memory such as a ROM or a RAM. The storage unit 12 may be an internal memory incorporated in the mobile terminal 1 or an external memory configured to be removable from the mobile terminal 1. The storage unit 12 may store a control program that controls respective components of the mobile terminal 1. The storage unit 12 may store an application program that executes an application installed in the mobile terminal 1. For example, the application includes applications on a telephone, a message, a camera, a web browser, a map, a game, a schedule management and the like. The application may include a pre-application installed at the time of manufacture or shipment by the manufacturer of the mobile terminal 1, or may include an application installed from a communication network or a storage medium. The storage unit 12 may include a working memory that stores data temporarily used in the execution of a program.

In the embodiments, the storage unit 12 includes a temporary storage folder 12a that temporarily stores an image captured by the in-camera 8 and the out-camera 9. The image stored in the temporary storage folder 12a is used by the user to determine whether or not to store the image in a permanent storage folder 12b. The storage unit 12 includes the permanent storage folder 12b for permanently storing an image captured by the in-camera 8 and the out-camera 9. The permanent storage folder 12b is an example of a storage that stores a captured image. The image stored in the permanent storage folder 12b is referred to by the user. The storage unit 12 includes an editing folder 12c for temporarily storing an image captured by the in-camera 8 and the out-camera 9. The image stored in the editing folder 12c is used to process the image taken by the in-camera 8 and the out-camera 9. The process of the image includes a process of adjusting the focal distance of each region included in the predetermined imaging region.

The image output unit 13 includes the display 3. The image output unit 13 displays various images on the display 3 shown in FIG. 1A. Specifically, the image output unit 13 displays an image on the display 3 based on the control signal and the image signal input from the control unit 11. The image output unit 13 may perform lighting, lighting out, and brightness adjustment of the display 3 in accordance with the control signal input from the control unit 11. The image output unit 13 may cause the display 3 to emit a flash in accordance with the control signal input from the control unit 11. The flash may be white light.

The touch detection unit 14 includes the touch panel 4. The touch detection unit 14 detects a touch operation on the touch panel 4 illustrated in FIG. 1A. Specifically, the touch detection unit 14 detects the position of the touch operation (hereinafter, touch position), and outputs a position signal corresponding to the detected touch position to the control unit 11. For example, the touch operation is performed on an object displayed on the display 3, and the object is associated with a function that can be executed by the mobile terminal 1.

Here, the touch operation may include not only an operation in which the user's finger contacts the touch panel 4 but also an operation in which the user's finger approaches the touch panel 4. The touch operation may include a tap operation in which two or more touch operations are continuously performed within a predetermined time. The touch operation may include a flick operation or a slide operation in which the touch position moves with the touch operation performed.

The audio input unit 15 includes the microphone 5. The audio input unit 15 outputs an electrical signal to the audio processing unit 17 in accordance with the sound detected by the microphone 5.

The audio output unit 15 includes the speaker 6 and the external speaker 7. The audio output unit 16 acquires an electrical signal input from the audio processing unit 17. The audio output unit 16 outputs a sound to the speaker 6 or the external speaker 7 in accordance with the acquired electrical signal.

The audio processing unit 17 converts an electrical signal input from the audio input unit 15 into a digital signal by an A/D conversion or the like, and outputs the digital signal to the control unit 11. The audio processing unit 17 converts a digital signal input from the control unit 11 into an electrical signal by a D/A conversion or the like, and outputs the electrical signal to the audio output unit 16.

The key input unit 18 is an interface including a key operated by the user. For example, the key input unit 18 may include at least one or more hard keys. For example, the hard key may include a power key for powering on the mobile terminal 1. The key input unit 18 outputs a signal corresponding to the pressed key to the control unit 11.

The communication unit 19 is constituted by a communication module or the like, and performs at least one of call and communication. The communication unit 19 includes a signal conversion circuit, an antenna, and the like. The communication unit 19 includes a communication interface. The communication unit can perform communication in a wired or wireless manner.

The first imaging unit 20 has at least one processor. The first imaging unit 20 may include the in-camera 8. The first imaging unit 20 processes the image captured by the in-camera 8. For example, the first imaging unit 20 has an automatic exposure function, and may adjust the exposure value (f-stop number, shutter speed) according to the amount of light taken into the wide-angle lens. The first imaging unit 20 has an automatic white balance function, and may adjust the white balance value according to the light taken into the wide-angle lens.

The second imaging unit 21 has at least one processor. The second imaging unit 21 may include the out-camera 9. The second imaging unit 21 processes the image captured by the out-camera 9. For example, the second imaging unit 21 has an automatic exposure function, and may adjust the exposure value (f-stop number, shutter speed) according to the amount of light taken into the wide-angle lens. The second imaging unit 21 has an automatic white balance function, and may adjust the white balance value according to the light taken into the wide-angle lens.

The illuminance detection unit 22 may include an illuminance sensor that detects the brightness around the mobile terminal 1. The illuminance detection unit 22 outputs a signal indicating the detected brightness to the control unit 11. The detected brightness may be used in the process in which the control unit 11 adjusts the brightness of the display 3.

The various processes described as being performed by each functional unit or each detection unit may be performed by the control unit 11. Respective functional units include the storage unit 12, the image output unit 13, the audio output unit 16, the audio processing unit 17, the key input unit 18, the communication unit 19, the first imaging unit 20, and the second imaging unit 21. Respective detection units include the touch detection unit 14, the audio input unit 15, and the illuminance detection unit 22.

(Application Scene)

Hereinafter, application scenes according to the embodiments will be described. Here, the out-camera 9 is taken as an example of an imaging device, and the second imaging unit 21 is taken as an example of a processor.

Specifically, as shown in the upper part of FIG. 3, the out-camera 9 captures a plurality of captured images having a predetermined imaging region and having different focal distances. The plurality of captured images are stored in the editing folder 12c. For example, the predetermined imaging region is defined by the wide-angle lens that the out-camera 9 has. In the following, the focal distance may be referred to as a depth. FIG. 3 exemplifies a case where seven captured images are captured. In other words, the out-camera 9 captures a captured image at seven types of depths.

The second imaging unit 21 performs a first process of identifying at least two or more focus identification regions included in the first imaging region by comparing a plurality of captured images in the first imaging region included in the predetermined imaging region. The second imaging unit 21 performs a second process of interpolating the focal distance of an intermediate region which does not belong to any of the two or more focus identification regions in the first imaging region. The second process includes a process of interpolates the focal distance of the middle region based on the focal distance of the interpolation focus region which is located inside or outside the middle region and which is any of the two or more focus identification regions. The interpolation focus region may be all the focus identification regions included in the first imaging region, or may be part of the focus identification regions. The second imaging unit 21 determines an interpolation focus region based on the lengths of the respective border lines between the middle region and the focus identification regions when the focus identification regions are located both inside and outside the middle region. That is, the second imaging unit 21 sets, as the interpolation focus region, a focus identification region having a longer border line with the middle region of the focus identification region located inside the middle region and the focus identification region located inside the middle region, and may perform the second process based on the interpolation focus region. The first imaging region is a set of points of any size belonging to the middle region or the focus identification region. The border line is a set of points shared by the middle region and the focus identification region. The second imaging unit 21 may determine the interpolation focus region based on the areas of the respective focus identification regions when the focus identification region is located both inside and outside the middle region. That is, the second imaging unit 21 sets, as the interpolation focus region, a focus identification region having a larger region of the focus identification region located inside the middle region and the focus identification region located inside the middle region, and may perform the second process based on the interpolation focus region. The second imaging unit 21 may determine the interpolation focus region based on the depths of the focal distances of the respective focus identification regions when the focus identification region is located both inside and outside the middle region. That is, the second imaging unit 21 sets, as the interpolation focus region, the focus identification region having a shallower focal distance of the focus identification region located inside the middle region and the focus identification region located inside the middle region, and may perform the second process based on the interpolation focus region. The second imaging unit 21 may always set the focus identification region located inside the middle region as the interpolation focus region. The second imaging unit 21 may always set the focus identification region located outside the middle region as the interpolation focus region.

In the embodiment, the second imaging unit 21 divides the first imaging region into a plurality of divided regions, and also identifies divided regions where the depth is identified (focus identification region) and divided regions where the depth is not identified (middle region). For example, the divided regions are a region in which a predetermined imaging region is divided by 60×60.

Here, the first process and the second process may be applied when the distance from the out-camera 9 to the subject is equal to or less than a predetermined distance. That is, when the distance from the imaging device to the subject is larger than the predetermined distance, a process (for example, human detection processing) other than the first process and the second process may be applied.

(Depth Map Generation)

The generation of the depth map according to the embodiment will be described below.

The second imaging unit 21 compares edge components of a plurality of captured images for each divided region by applying various methods to each of the plurality of captured images. The various methods may be methods using a first derivative or a second derivative. For example, the method using a first derivative includes a Sobel filter and a Prewitt filter. For example, the method using the second derivative includes a Laplacian filter. Below, the example in which the Laplacian filter for detection of the edge component of a captured image is used is demonstrated.

The second imaging unit 21 identifies the depth of the captured image having the largest edge component as the depth of the divided region on condition that the largest edge component is larger than the threshold in the first process. The divided region whose depth is identified is any of the two or more focus identification regions. For example, when the edge component of first sheet of captured image of the target divided region is the largest, the second imaging unit 21 identifies the depth of the first sheet of captured image as the depth of the target divided region.

The second imaging unit 21 identifies a divided region whose largest edge component is equal to or less than the threshold in the second process. It should be noted that the reliability of the depth of such a divided region is low. A divided region whose largest edge component is equal to or less than the threshold is a middle region not belonging to any of two or more focus identification regions. For example, when the edge components of all the captured images of the target divided region are equal to or less than the threshold, the second imaging unit 21 identifies such a target divided region as the middle region.

Through the process, the second imaging unit 21 generates a depth map shown in the lower part of FIG. 3. As shown in the lower part of FIG. 3, the focus identification region may exist outside the middle region, and the focus identification region may exist inside the middle region. Here, the case is illustrated where a portion of the dish is identified as the middle region because the portion of the dish is a single-color portion with a small edge component. On the other hand, the case is illustrated where since a portion of the cake and the background of the dish placed on the dish has a larger edge component, the portion is identified as the focus identification region.

(Redetection of Edge Component)

Hereinafter, reidentification of a middle region according to the embodiment will be described.

In the second process, the second imaging unit 21 identifies a target region including a middle region as shown in the upper and middle parts of FIG. 4. That is, the second imaging unit 21 may identify the position of the middle region and determine the target region so as to include the identified position. The middle region whose position is identified may be one of the plurality of middle regions included in the first imaging region. The target region may be a region obtained by enlarging the middle region by 20%. In the upper and middle parts of FIG. 4, the target region has a rectangular shape, but the target region may be a shape similar to that of the middle region. Here, the case is illustrated where the region including a portion of the dish is identified as the target region.

In the second process, as shown in the lower part of FIG. 4, the second imaging unit 21 sets, to a predetermined color, a predetermined region located in at least one of the inside and the outside of the middle region in the target region and the middle region. Here, the case is illustrated where a predetermined region located outside the middle region is converted into a predetermined color. A predetermined region located inside the middle region may be converted to a predetermined color. However, it should be noted that the boundary that divides the middle region is not converted to the predetermined color. Although not particularly limited, the predetermined color may be black.

The second imaging unit 21 applies the Laplacian filter to each of the plurality of captured images for the target region, and detects edge components of the plurality of captured images not for each divided region but for the entire target region, and compares the detected edge components. The second imaging unit 21 may detect and compare edge components of a plurality of captured images for each divided region for the target region. The second imaging unit 21 reidentifies the target region edge component. In other words, the edge component is reidentified in the target region after the predetermined region is converted to the predetermined color.

As described above, the interpolation focus region may be determined based on the length of the border line between the middle region and the focus identification region, the area of the focus identification region, or the depth of the focal distance of the focus identification region. The above process may be performed based on edge components reidentified for each divided region.

Note that, when the interpolation focus region is determined for example, based on the length of the border line between the middle region and the focus identification region, as long as the second imaging unit 21 identifies the target middle region, the second imaging unit 21 can determine the interpolation focus region based on edge component detected first (the edge component detected for the first imaging region). In this case, after the second imaging unit 21 identifies the middle region, the second imaging unit 21 may identify only the target region including the middle region and may not perform a re-detection of the edge component.

(First Interpolation Process)

The first interpolation process according to the embodiment will be described below.

In the second process, the second imaging unit 21 interpolates the focal distance of the middle region based on the focal distance of the interpolation focus region which is located inside or outside the middle region and which is any of the two or more focus identification regions. That is, the second imaging unit 21 generates a depth map shown in the lower part of FIG. 5 by interpolating the focal distance of the middle region with respect to the depth map shown in the upper part of FIG. 5 (same as the depth map shown at the bottom of FIG. 3). Here, the case is illustrated which the focus identification region constituting a portion of the cake is used as the interpolation focus region.

Note that which one of the focus identification region located inside the middle region and the focus identification region located inside the middle region is used as the interpolation focus region is not limited to the above-described example. For example, when edge components of a plurality of captured images are compared in the entire target region, one edge component is detected for one captured image. The second imaging unit 21 may perform the second process based on the edge component having the strongest peak among the edge components. That is, the second imaging unit 21 may set, as an interpolation focus region, a region having a focal distance corresponding to the edge component having the strongest peak among these edge components, and may perform the second process based on the interpolation focus region. At this time, the region having a focal distance corresponding to the edge component having the strongest peak may be the focus identification region located inside the middle region or the focus identification region located outside the middle region.

In another embodiment, the second imaging unit 21 detects edge components of a plurality of captured images for each divided region for the target region, and superimposes them on each other, and may identify one edge component for one captured image.

Here, the middle region to which such an interpolation process (hereinafter, first interpolation process) is applied may be a middle region having a predetermined area or less. In other words, the first interpolation process may not be applied to a middle region larger than the predetermined area.

Such a first interpolation process may be performed in units of divided regions, or may be performed in unit of pixels constituting a divided region.

(Second Interpolation Process)

The second interpolation process according to the embodiment will be described below.

The second imaging unit 21 identifies the remaining region whose focal distance is not identified after interpolating the middle region, and interpolates the focal distance of the remaining area based on the focal distance of the interpolation focus region included in the column direction or row direction of the remaining region. The second imaging unit 21 generates a depth map shown in the lower part of FIG. 6 by interpolating the focal distance of the remaining region with respect to the depth map shown in the upper part of FIG. 6 (same as the depth map shown at the bottom of FIG. 5). Here, the case is illustrated where a focus identification region with the largest area of the focus identification regions included in the row direction of the remaining region is used as the interpolation focus region. As the focus identification region, a divided region whose focal distance is interpolated in the above-described first interpolation process may be used.

Such a second interpolation process may be performed in units of divided regions, or may be performed in units of pixels constituting a divided region.

(Image Processing Method)

Hereinafter, an image processing method according to the embodiment will be described.

As shown in FIG. 7, in step S10, the second imaging unit 21 (hereinafter simply referred to as a processor) of the mobile terminal 1 determines whether or not the distance from the out-camera 9 to a subject (subject distance) is equal to or less than a predetermined distance. The processor performs the process of step S30 when the determination result is YES. The processor performs the process of step S20 when the determination result is NO.

In step S20, the processor determines whether or not the person detection is possible by the captured image. The processor performs the process of step S40 when the determination result is YES. The processor performs the process of step S50 when the determination result is NO. Here, a known method such as image matching can be used as a method of the person detection.

In step S30, the processor executes a first imaging process. The first imaging process is a process including the first process and the second process described above. Details of the first imaging process will be described later (see FIG. 8).

In step S40, the processor executes a second imaging process. The second imaging process may include a process of distinguishing a region including a subject (person region) and a region not including the subject (background region) by detecting the person. The second imaging process may include a process of individually changing the focal distance of the person region and the focal distance of the background region. The second imaging process may be a process of generating an image with a blurred background region, or may be a process of generating an image with a blurred person region.

In step S50, the processor executes a third imaging process. The third imaging process is a process of capturing only one captured image. In the third imaging process, a depth map is not generated, and one captured image is stored as it is.

Details of the first imaging process described above will be described below.

Figure 8:
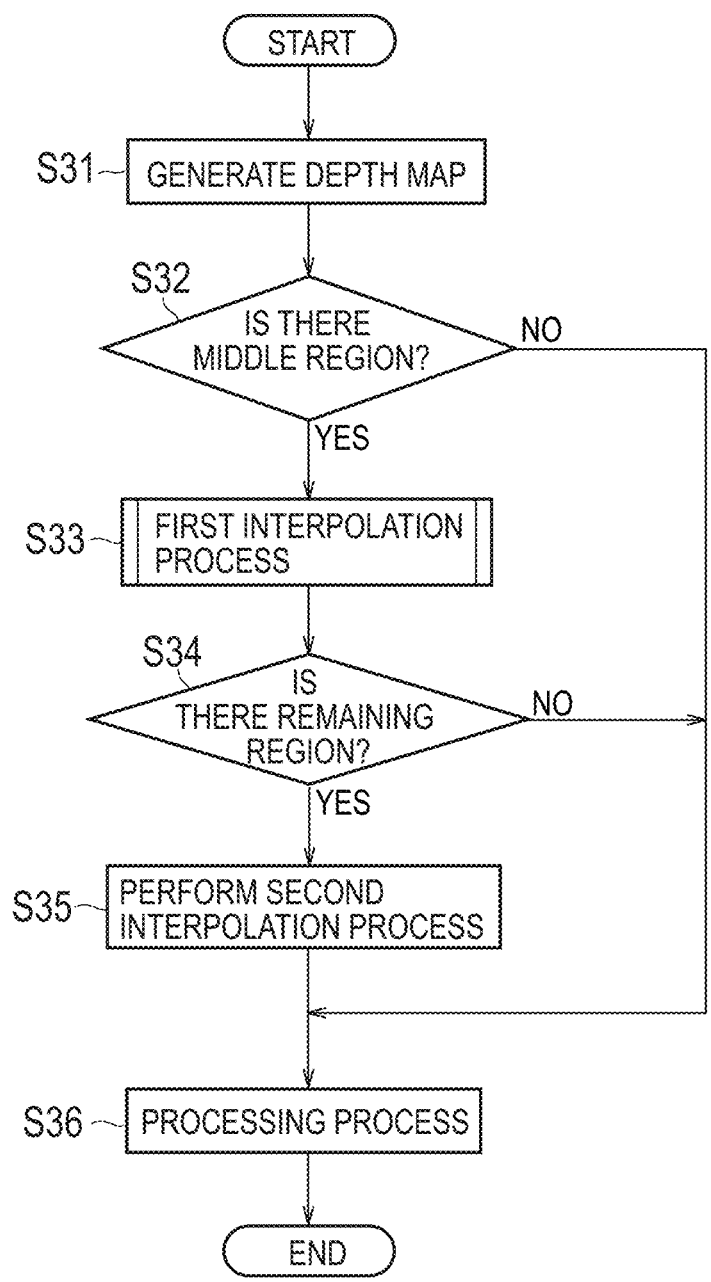
FIG. 8 is a diagram showing an image processing method according to the embodiment.

As shown in FIG. 8, in step S31, the processor generates a depth map shown in the lower part of FIG. 3. Specifically, the processor compares edge components of the plurality of captured images for each divided region by applying the Laplacian filter to each of the plurality of captured images. The processor identifies a divided region whose largest edge component is larger than the threshold as the focus identification region. The processor identifies a divided region whose largest edge component is less than or equal to the threshold as a middle region. Step S31 is a process common to the first process and the second process.

In step S32, the processor determines whether or not there is a middle region. The processor performs the process of step S33 when the determination result is YES. The processor ends the series of processes when the determination result is NO.

In step S33, the processor interpolates the focal distance of the middle region (first interpolation process). The processor interpolates the focal distance of the middle region based on the focal distance of the interpolation focus region located inside or outside the middle region as described with reference to FIGS. 4 and 5. Details of the first interpolation process will be described later (see FIG. 9). Step S33 is part of the second process.

In step S34, the processor determines whether or not there is a remaining region. The processor performs the process of step S35 when the determination result is YES. The processor ends the series of processes when the determination result is NO.

In step S35, the processor interpolates the focal distance of the remaining region (second interpolation process). The processor interpolates the focal distance of the remaining region based on the focal distance of the interpolation focus region included in the column direction or the row direction of the remaining region whose focal distance is not identified as described with reference to FIG. 6. Step S35 is part of the second process.

In step S36, the processor performs a process of processing a captured image using the depth map whose focal distance is interpolated. The process (third process) of processing the captured image includes a process of identifying a blurred region to be subjected to the blurring process and a non-blurred region not to be subjected to the blurring process. At least one of the blurred region and the non-blurred region may be configured to be selectable by the user.

The process (third process) of processing the captured image includes a process of identifying a main image from among a plurality of captured images based on the non-blurred region. The main image may be a captured image having the depth of the focal distance of the non-blurred region. The process (third process) of processing the captured image includes a process of performing blurring processing on one of the plurality of captured images to generate a blurred image. One of the plurality of captured images may be a main image. The process (third process) of processing the captured image includes a process of combining the non-blurred regions in the blurred image and the main image based on the blurred region and the non-blurred region.

Details of the first interpolation process described above will be described below.

Figure 9:
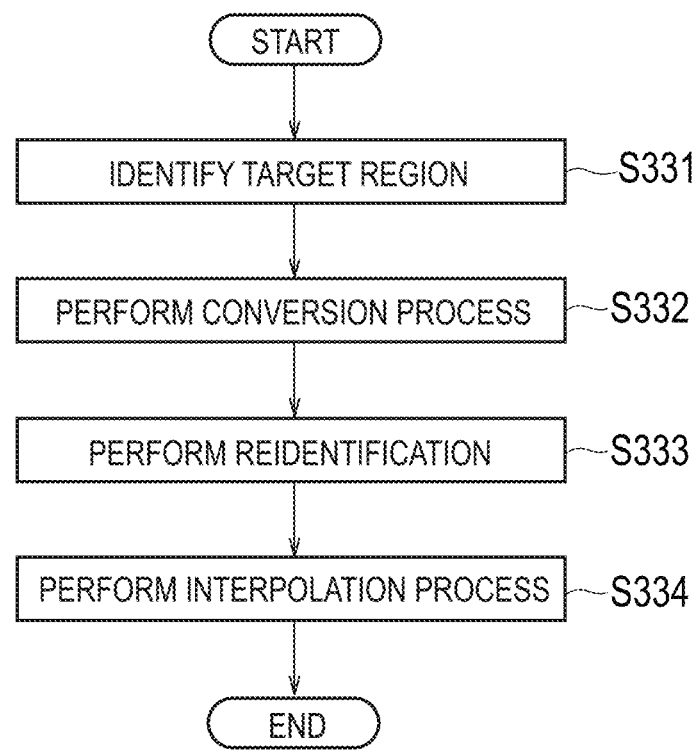
FIG. 9 is a view showing an image processing method according to the embodiment.

As shown in FIG. 9, in step S331, the processor identifies a target region including the middle region. For example, the target region may be a region obtained by enlarging the middle region by 20%.

In step S332, the processor converts, into a predetermined color, a predetermined region located at least one of the inside and the outside of the middle region in the target region including the middle region.

In step S333, the processor reidentifies a middle region included in the target region.

In step S334, the processor interpolates the focal distance of the middle region based on the focal distances of the interpolation focus region located inside or outside the middle region. The focus identification region having the largest region of the focus identification regions located around the middle region may be used as the interpolation focus region.

(Function and Effect)

In the embodiment, the mobile terminal 1 interpolates the focal distance of the middle region based on the focal distance of the interpolation focus region which is located inside or outside the middle region and which is any of the two or more focus identification regions. According to such a configuration, even if a region in which the edge component does not appear (for example, a single color region) exists, the mobile terminal 1 can interpolate the focal distance of the region (middle region) in which the edge component does not appear. As a result, the image processing such as a blurring process can be appropriately performed by an appropriate interpolation of the focal distance.

In the embodiment, the mobile terminal 1 identifies a target region including the middle region. Further, the mobile terminal 1 converts, into a predetermined color, a predetermined region located at least one of the inside and the outside of the middle region in the target region including the middle region. According to such a configuration, even when there is a plurality of middle regions, the mobile terminal 1 can appropriately select the middle region to which the first interpolation process is applied. As a result, the interpolation process can be simplified and the accuracy of the interpolation process can be improved.

In the embodiment, the mobile terminal 1 performs the first imaging process including the first process and the second process when the subject distance is equal to or less than the predetermined distance. According to such a configuration, it is possible to suppress an increase in the processing load of the mobile terminal 1 by applying the first imaging process to a captured image for which effects are not expected.

Modification

In the following, a modification of the embodiment will be described. In the modification, differences with respect to the embodiment will be mainly described.

In the modification, in order to increase the accuracy of identification of the region whose focal distance is identified or interpolated, a correction process is performed in which the range of the region whose focal distance is identified or interpolated is corrected by comparing the outline image with the region whose focal distance is identified. The region whose focal distance is identified is a region in which the focal distance is identified by comparison between a plurality of captured images, and the region whose focal distance is interpolated is a middle region after the first interpolation process and the second interpolation process are performed. These regions are simply referred to as focus identification regions below because the focal distance has already been determined.

First, as shown in the upper part of FIG. 10, the second imaging unit 21 generates an outline image obtained by binarizing pixels included in each of a plurality of captured images. For example, the binarization may be performed using at least one of three primary color signals (RGB signals) and a luminance signal (Y signal). The second imaging unit 21 may generate two or more outline images from one captured image by using two or more thresholds for one captured image. Furthermore, the second imaging unit 21 superimposes a plurality of outline images to generate one outline image.

Second, the second imaging unit 21 superposes the depth map shown in the lower part of FIG. 6 on the outline image as shown in the middle part of FIG. 10.

Third, as shown in the lower part of FIG. 10, the second imaging unit 21 corrects the range of the focus identification region by comparing the outline image with the focus identification region. Specifically, the second imaging unit 21 identifies an outline region having a size larger than a predetermined threshold among the outline regions divided by the outline in the outline image. When the focus identification region overlapping the identified outline region is equal to or greater than a threshold (for example, 50%), the second imaging unit 21 corrects the focus identification region so that the whole of the identified outline region is a focus identification region overlapping the outline region.

(Image Processing Method)

Hereinafter, an image processing method according to the modification will be described.

Figure 11:
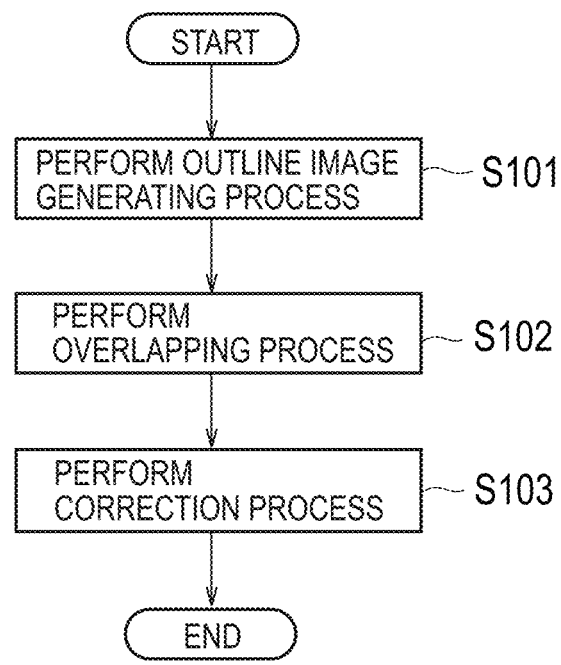
FIG. 11 is a diagram showing an image processing method according to the modification.

In FIG. 11, as shown in step S101, the second imaging unit 21 (hereinafter simply referred to as a processor) of the mobile terminal 1 generates an outline image obtained by binarizing pixels included in each of a plurality of captured images. The processor superimposes the plurality of outline images to generate one outline image.

In step S102, the processor superimposes the depth map on the outline image.

In step S103, the processor corrects a focus identification region overlapping with an outline region having a size larger than a predetermined threshold.

(Function and Effect)

In the modification, the mobile terminal 1 corrects the range of the focus identification region by comparing the outline image with the focus identification region. According to such a configuration, the identification accuracy of two or more focus identification regions is improved.

In the modification, the mobile terminal 1 corrects the focus identification region using the outline region having a size larger than the predetermined threshold. According to such a configuration, it is possible to suppress an increase in the processing load of the mobile terminal 1 by applying the correction process to a region for which effects are not expected.

Modification

In the following, a modification of the embodiment will be described. In the modification, differences with respect to the embodiment will be mainly described.

In the modified example, a graphical user interface (GUI) of the mobile terminal 1 will be described. The GUI is an image displayed on the display 3 of the mobile terminal 1.

First, a GUI relating to a first imaging mode in which the first imaging process including the first process and the second process is used will be described. Here, in order to simplify the description, modes other than the first imaging mode are referred to as the normal mode. The normal mode may be a mode in which the second imaging process and the third imaging process described above are used, or may be an initial mode when an application for the out-camera 9 is activated.

Figure 12:
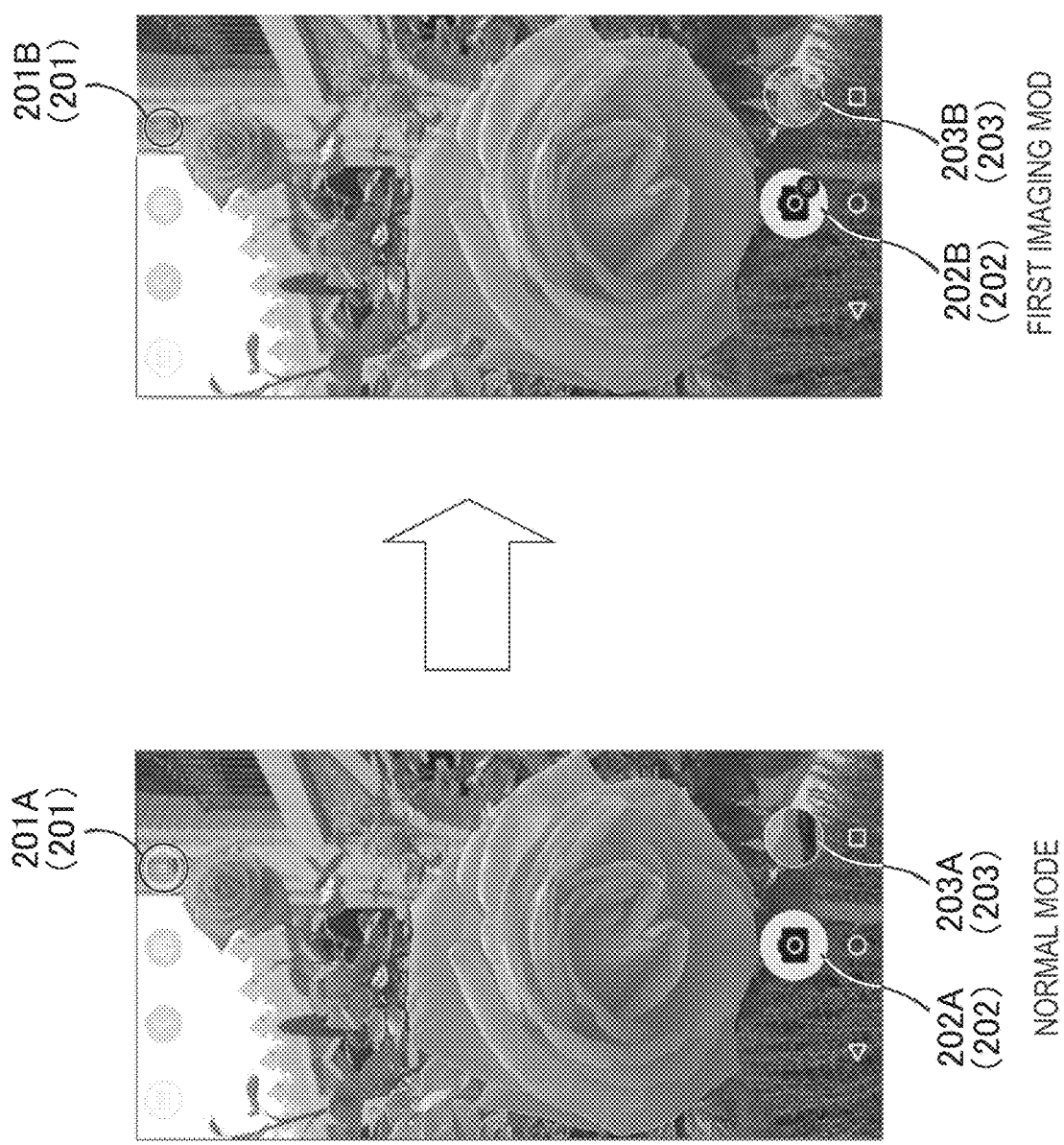
FIG. 12 is a view showing an example of a GUI according to the modification.

Specifically, as shown in FIG. 12, the GUI includes a first imaging mode icon 201, a shutter icon 202, and a thumbnail icon 203. The first imaging mode icon 201 is an icon for activating the first imaging mode. The shutter icon 202 is an icon for capturing an image by the out-camera 9. The thumbnail icon 203 is an icon for displaying a thumbnail of an image stored in the storage unit 12.

Here, the arrangement of the first imaging mode icon 201, the shutter icon 202, and the thumbnail icon 203 is common to the GUIs in the normal mode and the first imaging mode. A first imaging mode icon 201A in the normal mode displays that the first imaging mode is inactive (for example, non-lighting). A first imaging mode icon 201B in the first imaging mode displays that the first imaging mode is active (for example, lighting). A shutter icon 202B in the first imaging mode is displayed in a form different from a shutter icon 202A in the normal mode. Similarly, a thumbnail icon 203B in the first imaging mode is displayed in a form different from a thumbnail icon 203A in the normal mode. That is, the shutter icon 202A and the thumbnail icon 203B are dedicated icons indicating that the current mode is the first imaging mode.

Figure 13:
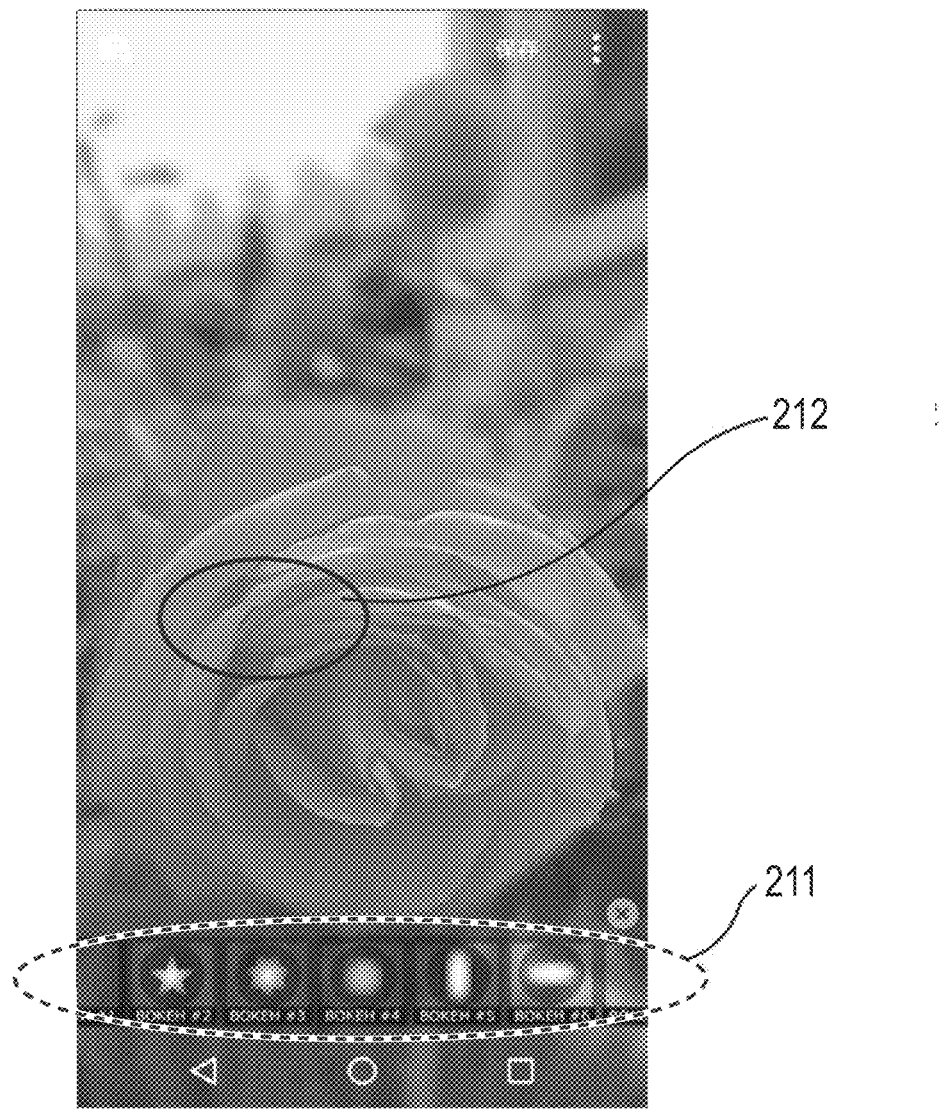
FIG. 13 is a view showing an example of a GUI according to the modification.

Second, a GUI relating to an editor for using the first imaging mode will be described. As shown in FIG. 13, the GUI includes a plurality of effect icons 211 for selecting an effect of the blurring process. For example, when part of the display image (for example, a touch region 212) is selected by the user in a state where the effect icons 211 are selected, the blurring process corresponding to the effect icons 211 is applied based on the touch region 212.

Here, the blurring process corresponding to the effect icons 211 may include a process of relatively reducing an edge component, and may include a process of relatively enlarging an edge component.

Modification

In the following, a modification of the embodiment will be described. In the modification, differences with respect to the embodiment will be mainly described.

In the modification, the out-camera 9 captures a plurality of first captured images having the first resolution and a plurality of second captured images having the second resolution smaller than the icon first resolution as the plurality of captured images. The imaging ranges and focal distances of the plurality of first captured images correspond to the respective imaging ranges and focal distances of the plurality of second captured images.

First, the second imaging unit 21 may perform the first process and the second process using a plurality of second captured images. The second imaging unit 21 may perform a process of processing the plurality of first captured images based on the focal distances acquired using the plurality of second captured images. According to such a configuration, it is possible to process an image with high resolution while reducing the processing load of the first process and the second process.

Second, the second imaging unit 21 may perform a process of storing the plurality of first captured images in the permanent storage folder 12b without storing the plurality of second captured images in the permanent storage folder 12b. In such a case, the plurality of second captured images may be stored in the editing folder 12c during the performance of the first process and the second process, and may be deleted from the editing folder 12c after the completion of the first process and the second process.

Third, the second imaging unit 21 may perform a process of displaying the plurality of first captured images on the display 3 without displaying the plurality of second captured images on the display 3. The second imaging unit 21 may perform the first process and the second process using a plurality of second captured images in accordance with a user operation on at least one of the plurality of first captured images. The user operation may be a touch operation or a tap operation on part of the captured image shown in FIG. 13.

OTHER EMBODIMENTS

Although the present disclosure has been described by the embodiments described above, it should not be understood that the descriptions and the drawings that form part of this disclosure limit the present disclosure. From this disclosure, various alternative embodiments, examples and operational techniques will be apparent to those skilled in the art.

In the embodiment, the case where the first process and the second process are applied to a captured image captured by the out-camera 9 is illustrated. However, the embodiment is not limited to this. The first process and the second process may be applied to a captured image captured by the in-camera 8.

In the embodiment, the case where seven captured images are captured is described. However, the embodiment is not limited to this. The first process and the second process may be applied to three or more captured images. According to such a configuration, it is possible to perform the blurring process not on the two types of the subject and the background but on the captured images having the focal distances of at least three or more levels. However, the number of captured images to which the first process and the second process are applied may be two.

In the embodiment, the mobile terminal 1 is illustrated as an example of the electronic device. However, the embodiment is not limited to this. The electronic device may be any device provided with an imaging device, and may be a digital camera.

Although not particularly mentioned in the embodiment, a program may be provided which causes a computer to execute respective processes performed by the mobile terminal 1. The program may also be recorded on a computer readable medium. Use of a computer readable medium makes it possible to install a program in a computer. Here, the computer readable medium on which the program is recorded may be a non-transitory recording medium. The non-transitory recording medium is not is not specific, but it may be a recording medium such as CD-ROM or DVD-ROM, for example.

Alternatively, a chip constituted by a memory storing a program for executing respective processes performed by the mobile terminal 1 and a processor executing the program stored in the memory may be provided.

The invention claimed is:

1. An electronic device comprising:
    an imaging device having a predetermined imaging region, wherein the imaging device is configured to capture images having different focal distances; and
    a processor configured to execute
        a first process of identifying two or more focus identification regions included in a first imaging region included in the predetermined imaging region by comparing the captured images in the first imaging region, and
        a second process of interpolating a focal distance of a middle region not belonging to the two or more focus identification regions in the first imaging region,
    wherein the second process includes a process of interpolating the focal distance of the middle region based on a focal distance of an interpolation focus region that is located inside or outside the middle region and that is one of the two or more focus identification regions.

2. The electronic device according to claim 1, wherein the second process includes processes of
    converting, into a predetermined color, a predetermined region located at least one of the inside and the outside of the middle region in a target region including the middle region, and
    reidentifying the middle region in the target region after the predetermined region is converted into the predetermined color.

3. The electronic device according to claim 1, wherein the processor is further configured to execute processes of
    identifying a remaining region whose focal distance is not identified after interpolating the middle region, and
    interpolating a focal distance of the remaining region based on a focal distance of the interpolation focus region included in a column direction or a row direction of the remaining region.

4. The electronic device according to claim 1, wherein the second process includes correction processes of
    generating an outline image obtained by binarizing pixels included in each of the captured images, and
    correcting a range of a region whose focal distance is identified or interpolated by comparing the region whose focal distance is identified or interpolated with the outline image.

5. The electronic device according to claim 4, wherein the processor is further configured to compare an outline region having a size larger than a predetermined threshold among outline regions divided by an outline included in the outline image with the region whose focal distance is identified or interpolated.

6. The electronic device according to claim 1, wherein the processor is further configured to execute the first process and the second process when a distance from the imaging device to a subject is equal to or less than a predetermined distance.

7. The electronic device according to claim 6, wherein the processor is further configured to execute a process of identifying a region including a subject and a region not including the subject by a person detection when a distance from the imaging device to the subject is larger than a predetermined distance.

8. The electronic device according to claim 1, wherein the processor is further configured to execute third processes of
    identifying a blurred region to be subjected to a blurring process and a non-blurred region not to be subjected to the blurring process with respect to regions having different focal distances, the regions being obtained by the first process and the second process, and
    combining the blurred region and the non-blurred region.

9. The electronic device according to claim 1, wherein the captured images are three or more captured images.

10. The electronic device according to claim 1,
    wherein the captured images include first captured images having a first resolution, and second captured images having a second resolution smaller than the first resolution,
    wherein an imaging range and a focal distance of each of the first captured images correspond to an imaging range and a focal distance of each of the second captured images, and
    wherein the processor is further configured to execute
    the first process and the second process using the second captured images, and
    a process of processing the first captured images based on focal distances acquired using the second captured images.

11. The electronic device according to claim 10, further comprising:
    a storage configured to store captured images,
    wherein the processor is further configured to execute a process of storing the first captured images in the storage without storing the second captured images in the storage.

12. The electronic device according to claim 10, further comprising:
    a display,
    wherein the processor is configured to execute
        a process of displaying the first captured images on the display without displaying the second captured images on the display, and
        the first process and the second process using the second captured images in accordance with a user operation on at least one of the first captured images.

13. A method for use in an electronic device including at least an imaging device having a predetermined imaging region, wherein the imaging device is configured to capture images having different focal distances, the method comprising:
- identifying two or more focus identification regions included in a first imaging region included in the predetermined imaging region by comparing the captured images in the first imaging region; and
- interpolating a focal distance of a middle region not belonging to the two or more focus identification regions in the first imaging region,
- wherein the interpolating the focal distance of the middle region includes interpolating the focal distance of the middle region based on a focal distance of an interpolation focus region that is located inside or outside the middle region and that is one of the two or more focus identification regions.

14. A non-transitory recording medium that stores a program for use in an electronic device comprising at least an imaging device having a predetermined imaging region, wherein the imaging device is configured to capture images having different focal distances, the program causing a computer to execute:
- identifying two or more focus identification regions included in a first imaging region included in the predetermined imaging region by comparing the captured images in the first imaging region, and
- interpolating a focal distance of a middle region not belonging to the two or more focus identification regions in the first imaging region,
- wherein the interpolating the focal distance of the middle region includes interpolating the focal distance of the middle region based on a focal distance of an interpolation focus region that is located inside or outside the middle region and that is one of the two or more focus identification regions.

* * * * *